(No Model.)
F. W. MOLDENHAUER.
HORSESHOE ATTACHMENT FOR MARSHY GROUND.
No. 280,216. Patented June 26, 1883.
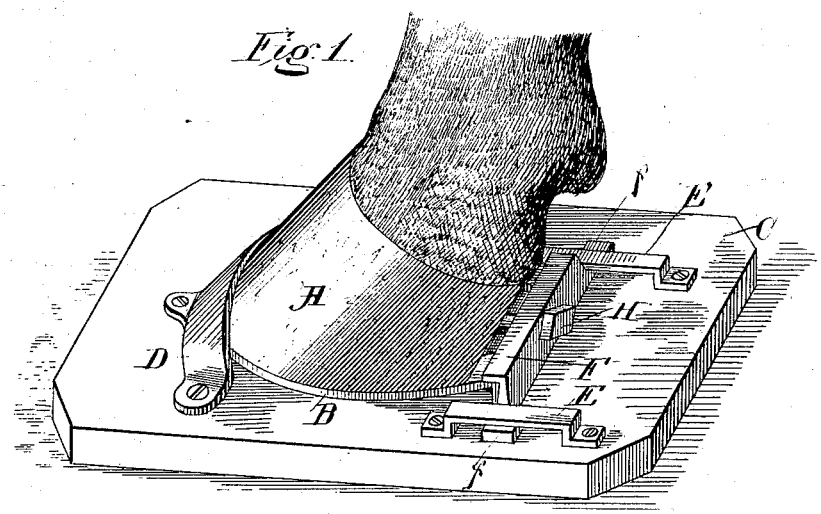
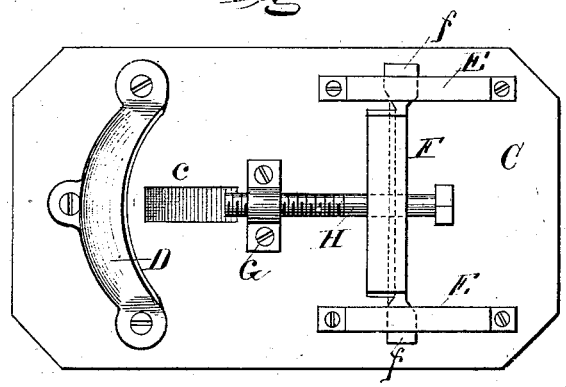
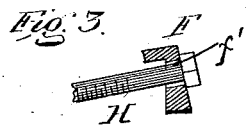
Witnesses:
Inventor:
Fredrick W. Moldenhauer
By
Stout & Underwood
Attorneys.

UNITED STATES PATENT OFFICE.

FREDRICK W. MOLDENHAUER, OF ASHIPPUN, WISCONSIN.

HORSESHOE ATTACHMENT FOR MARSHY GROUND.

SPECIFICATION forming part of Letters Patent No. 280,216, dated June 26, 1883.

Application filed May 9, 1883. (No model.)

*To all whom it may concern:*

Be it known that I, FREDRICK W. MOLDENHAUER, of Ashippun, in the county of Dodge, and in the State of Wisconsin, have invented certain new and useful Improvements in Horseshoe Attachments for Marshy Ground; and I do hereby declare that the following is a full, clear, and exact description thereof.

My invention relates to devices attached to the hoof and shoe of a horse to enable it to step with ease upon marshy or other yielding ground, and will be fully described hereinafter.

In the drawings, Figure 1 is a perspective view of a horse's hoof with my device attached thereto. Fig. 2 is a plan view of the said device, and Fig. 3 is a detail.

A represents a horse's hoof shod with an ordinary horseshoe, B.

C is a block or shoe, preferably of wood, provided with a groove, $c$, about midway between its sides and a little in front of the transverse center, and this groove deepens from rear to front.

D is a curved toe-piece, preferably of metal, to receive the front of the hoof and shoe, and rigidly secured to the block C; and E E are brackets, also preferably of metal, rigidly secured to the rear sides of the block C, and which receive the ends $ff$ of the heel-piece F, which ends move freely and somewhat loosely (to accommodate the device to shoes whose calks are more or less worn away) between the top of the block C and the under side of the said brackets E. The heel-piece F, between the brackets E, is angle-shaped in section, like an inverted L, and its horizontal portion rests on the rear of the horseshoe, as shown, and its vertical portion is provided with a perforation or slot, $f'$, which is inclined downward from rear to front, and somewhat elongated vertically to admit of adjustment for shoes whose calks may be of different heights.

G is a plate secured to the block C, just back of the groove $c$, and provided with a screw-threaded perforation, also extending downward from rear to front; and after the horse's hoof has been placed upon my device, with the front of the shoe and hoof under the toe-piece D, and with the heel-piece F adjusted over the rear ends of the shoe, a bolt, H, is slipped through the slot in the heel-piece F, and its forward screw-threaded end screwed through the hole in the plate G, (projecting into the groove $c$, if necessary,) and thus the whole is secured firmly in position, as shown in Fig. 1.

Having thus described my invention, what I claim as new, and desire to secure by Letters Patent, is—

A horseshoe attachment for marshy ground, consisting of a block, A, having toe-piece D and brackets E, in combination with a sliding heel-piece, F, slotted as described, screw-bolt H, and plate G, as set forth.

In testimony that I claim the foregoing I have hereunto set my hand, on this 18th day of April, 1883, in the presence of two witnesses.

FREDRICK W. MOLDENHAUER.

Witnesses:
   S. S. STOUT,
   H. G. UNDERWOOD.